United States Patent [19]

Neubrand

[11] Patent Number: 4,643,487
[45] Date of Patent: Feb. 17, 1987

[54] SLIP-CONTROLLED BRAKE SYSTEM FOR AUTOMOTIVE VEHICLES

[75] Inventor: Theo Neubrand, Idstein/Ts., Fed. Rep. of Germany

[73] Assignee: Alfred Teves GmbH, Frankfurt am Main, Fed. Rep. of Germany

[21] Appl. No.: 695,489

[22] Filed: Jan. 28, 1985

[30] Foreign Application Priority Data

Feb. 4, 1984 [DE] Fed. Rep. of Germany ....... 3403911

[51] Int. Cl.⁴ .................... B60T 8/02; B60T 8/26
[52] U.S. Cl. ................................. 303/114; 303/119
[58] Field of Search ............. 303/114, 119, 113, 100, 303/91, 92, 6 C, 93, 96, 68–69, 52, 61–63, 22; 188/345, 358, 349, 359, 19.5; 60/547.1, 545, 581, 548, 550

[56] References Cited

U.S. PATENT DOCUMENTS

| | | | |
|---|---|---|---|
| 4,354,714 | 10/1982 | Belart | 303/114 |
| 4,415,210 | 11/1983 | Belart et al. | 303/116 |
| 4,418,966 | 12/1983 | Hattwig | 303/100 |
| 4,440,454 | 4/1984 | Belart et al. | 303/114 |
| 4,492,413 | 1/1985 | Belart et al. | 303/119 X |

Primary Examiner—Douglas C. Butler
Attorney, Agent, or Firm—James B. Raden; William J. Michals

[57] ABSTRACT

A slip-controlled brake system for automotive vehicles comprises a braking pressure generator (1) including a power brake booster (2) supplied with auxiliary energy, as well as of a master cylinder (3) directly connected thereto. The wheel brakes of the rear axle HA are connected to the power brake booster (2), while the front-wheel brakes communicate with the working chamber (16) of the master cylinder (3). For the purpose of brake slip control, inlet valves (EV) are inserted into the pressure fluid conduits to the wheel brakes, and outlet valves, (AV) are inserted into the pressure fluid lines from the brakes to a pressure supply reservoir (15).

2 Claims, 1 Drawing Figure

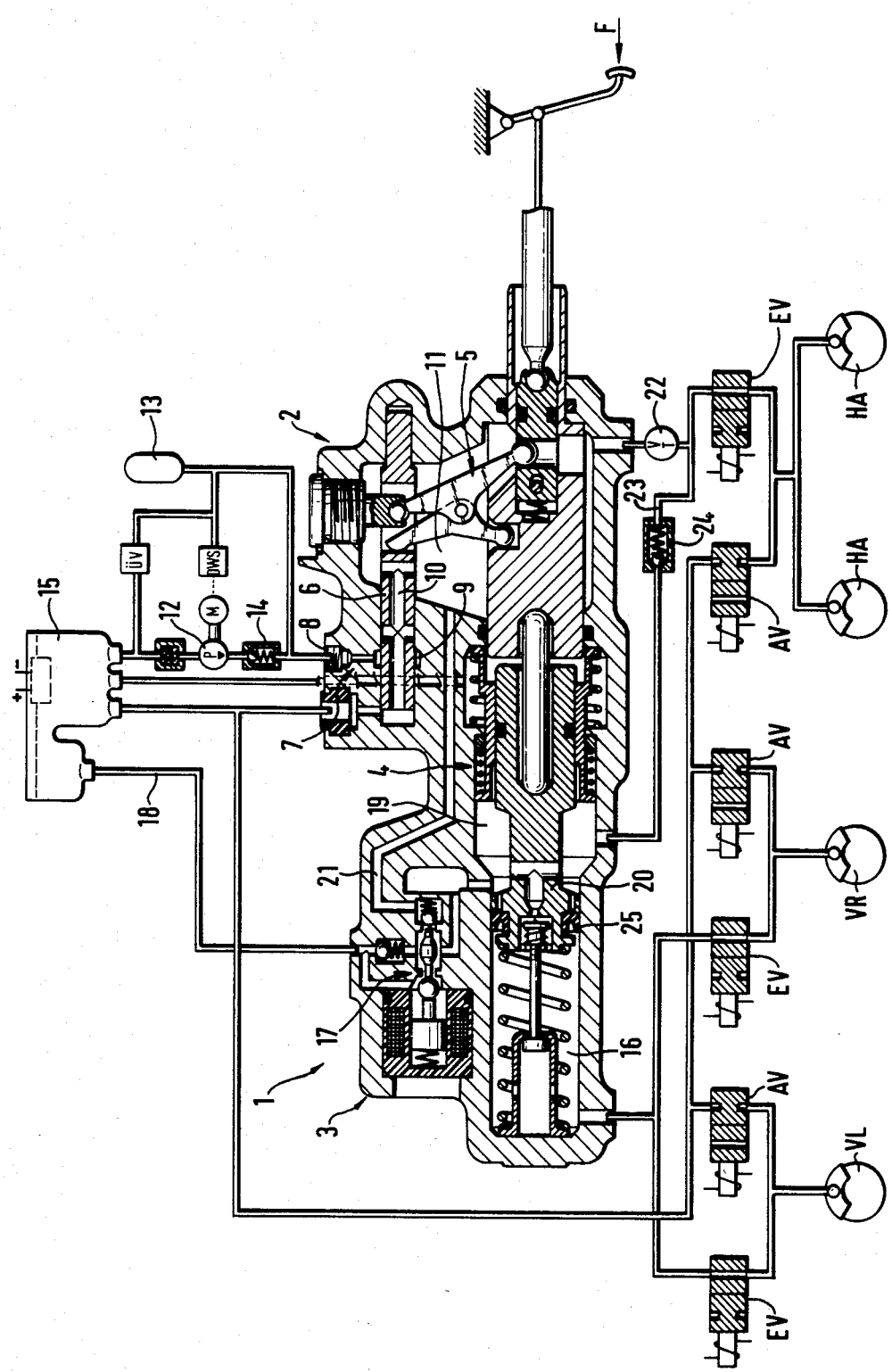

SLIP-CONTROLLED BRAKE SYSTEM FOR AUTOMOTIVE VEHICLES

BACKGROUND OF THE INVENTION

The present invention relates to a slip-controlled brake system provided for automotive vehicles comprising a braking pressure generator which is substantially composed of a power brake booster supplied with auxiliary energy and containing a control valve and a booster chamber, and a master cylinder directly connected to the booster and acted upon by the booster pressure. Several separate pressure fluid circuits connect the rear-wheel brakes to the power brake booster and the front-wheel brakes to the master cylinder with the circuits containing inlet valves which normally assume an opened position and are adapted to be closed for slip control. Normally closed lines are provided for the return flow of pressure fluid out of the wheel brakes to a pressure supply reservoir, and a normally closed pressure fluid conduit connects the power brake booster to the master cylinder through which pressure fluid is supplied out of the booster chamber by way of prechambers into the working chamber of the master cylinder upon response of the brake slip control.

A brake system of this type is described in German printed and published patent application 30 40 561. In this case, the braking pressure generator consists of a hydraulic power brake booster, the braking pressure control valve of which is mechanically coupled to the brake pedal. The pressure which is pedal-responsively introduced and built up in a pressure chamber within the braking pressure generator acts, on the one hand, on a single-type or tandem-type master cylinder which is part of the braking pressure generator and, on the other hand, directly on the wheel brakes at the rear axle of the vehicle. The working chamber of the master cylinder or, respectively, the two working chambers if a tandem master cylinder is concerned, is/are in hydraulic communication with the front-wheel brakes. To control brake slip by way of keeping the braking pressure constant or by decreasing it upon the occurrence of an imminent locked condition, there are inserted inlet valves into the pressure fluid lines to the brakes and outlet valves into hydraulic lines which connect the wheel brakes with the pressure supply reservoir. As soon as there is no need for brake slip control, the inlet valves adopt the opened position, while the outlet valves are in the closed position.

When designing the various components of the brake system, such as the braking pressure generator, the wheel brakes, the auxiliary energy supply system and the distribution of the pressure onto the rear axle and the front axle, those conditions prevailing in the "normal case", i.e. without the action of the brake slip control system, must be considered as well as the requirements arising in the event of panic stops or other situations in which brake slip control is put into operation. In addition, the brake system is required to be dimensioned such as to ensure that there will be maintained a force distribution as favorable as possible in the event of over-braking and de-activation of brake slip control, for example, a disturbance in the slip control system.

In this respect, specific legal provisions have to be complied with. For instance, in the event of overbraking it should be provided that for reducing the danger of skidding the rear wheels are allowed to lock, but only after the front wheels.

As the conditions and requirements imposed on the brake system are differing in the case of "normal" braking operation and during brake slip control, difficulties are involved when designing the brake system in finding an acceptable compromise.

It is therefore an object of the present invention to overcome the shortcomings of these prior art systems and to better adapt a brake system of the type described to the various situations prior to and after the commencement of slip control by simple means and by necessitating only little additional effort.

SUMMARY OF THE INVENTION

This object is achieved by improving upon a brake system such that a pressure reducer is inserted into the pressure fluid conduit from the power brake booster to the rear-wheel brakes between the booster outlet and the inlet valve, while a pressure fluid line arranged in parallel thereto which contains a normally closed check valve opening towards the wheel brake, and which communicates with an area of the master cylinder that is normally directly or indirectly connected to the pressure supply reservoir, into which area dynamic pressure will be introduced out of the power brake booster upon response of the slip control.

Significantly, it will be sufficient in many cases to use as a pressure reducer a force limiter with invariably set switch-off pressure. In other cases, it will be more favorable to use as a pressure reducer a brake force regulator with invariably set change-over pressure or a load-responsive brake force regulator.

According to another advantageous embodiment of the present invention, the pressure reducer and/or the check valve, which latter is inserted in the pressure fluid line in parallel to the pressure reducer, is unitized with the braking pressure generator.

By means of the present invention, it is possible by a minimum of additional effort to optimally adapt the brake system and in particular the braking pressure distribution onto the front axle and the rear axle to the requirements involved during normal braking operations and upon failure of the brake slip control system, i.e. upon the occurrence of disturbance or de-activation. Nevertheless, the entire unreduced braking pressure will be available also at the rear axle after the slip control has responded so that the rear wheels, as far as conditions admit, are enabled to contribute highly to the braking operation. This is of great advantage in many cases (for example, when the vehicle is loaded) in borderline situations in which a high adherence ability at all wheels is required. In any event, over-braking of the rear axle will be prevented by the control valves after commencement of slip control.

BRIEF DESCRIPTION OF THE DRAWING

Further features, advantages and applications of this invention are discernible from the following description of a preferred embodiment with reference to the accompanying drawing in which the single FIGURE illustrates a slip-controlled brake system in accordance with the principles of the present invention.

DETAILED DESCRIPTION

In this drawing, the braking pressure generator is generally assigned the reference numeral 1. It is substantially the structural combination of a power brake booster 2 and a master cylinder 3. The line of partition will be represented roughly by a so-termed positioning device 4.

The pedal force acts on the power brake booster in direction of the arrow F. By way of a double lever assembly 5, the pedal force F is transmitted onto the piston 6 of a braking pressure control valve 7. When the piston 6 is displaced to the left, with respect to the drawing figure, auxiliary hydraulic energy will be supplied by way of the inlet 8, an annular gap 9 and by way of inward channels 10 in piston 6 into a pressure chamber 11—that is, the booster chamber of the power brake booster 2.

All parts of the brake system are illustrated in the drawing in their inactive position. In this arrangement, the auxiliary energy supply system is essentially composed of a pump 12 driven by a motor and a pressure accumulator 13. The pressure side of the pump communicates via a check valve 14 with the inlet 8 in the braking pressure generator 1; the suction side is connected to a pressure supply reservoir 15.

The rear axle HA is connected to the power brake booster 2. On the other hand, the braking pressure for the two front wheels VL and VR is built up in the working chamber 16 of the master cylinder 3.

For the purpose of the brake slip control, inlet valves EV are inserted into the pressure fluid lines to the rear axle HA and to the front wheels, while outlet valves AV are contained in a pressure fluid conduit from the individual wheel brakes to the pressure supply reservoir 15. These valves are herein electromagnetically actuatable two-way/two position control valves.

Further, an electromagnetically actuatable double valve 17 is mounted into the braking pressure generator 1 which will be switched over when the brake slip control responds. In the initial position illustrated, the valve 17 will connect, via the pressure fluid conduit 18, a chamber 19 at the backside of the master cylinder working piston 20 with the pressure supply reservoir 15. Hence follows that atmospheric pressure is prevailing in said chamber 19 as long as slip control is not in operation.

When the slip control responds and the valve 17 is switched over, the connection from the chamber 19 to the conduit 18 will be interrupted, and a connection will be established between the pressure chamber 11 of the power brake booster 2 and the chamber 19 via the pressure fluid conduit in the braking pressure generator 1 designed as a channel 21. When a control action takes place, auxiliary energy will be introduced via this conduit into the chamber 19 and from said via the indicated check valves 25, arranged at the periphery of the master cylinder piston 20, into the working chamber 16. Moreover, the pressure in the chamber 19 acts in a known fashion upon the positioning device 4 and generates a restoring force in a direction opposite to the pedal force F.

Advantageously, a pressure reducer 22 is inserted into the pressure fluid conduit from the booster chamber 11 of the power brake booster 2 to the inlet valve EV, by way of which latter the pressure fluid is delivered to the wheel brakes at the rear axle HA. In the majority of cases, a pressure reducer of simple structure will suffice, namely a brake force limiter with invariably set switch-off pressure. Should it be more favorable or desired for specific reasons, a like force limiter can likewise be substituted by a known brake force regulator with invariably set change-over pressure or a load-responsive brake force regulator. All pressure reducers 22 permit to obtain better adaptation of the brake force distribution to the axle load distribution that is dependent on the load, on the vehicle speed etc.

Disposed in parallel to the pressure reducer 22 is a pressure fluid conduit which extends via the pressure fluid line 23, via a check valve 24 opening towards the wheel brake, via the chamber 19, a pressure fluid conduit within the valve 17 and via the channel 21 to the pressure chamber 11.

As long as brake slip is not in operation, atmospheric pressure will prevail in the chamber 19 so that the check valve 24 remains closed upon brake application. However, when brake slip control commences, the pressure introduced into the pressure chamber 11 through the pressure fluid conduit (11, 21, 17, 19, 24, 23) arranged in parallel to the pressure reducer 22 will be supplied unreduced to the rear-wheel brakes via the inlet valve EV allocated to the rear axle HA.

That is to say, in the event of control, the pressure reducer 22 will be disabled by using the valves present anyway, in particular by using valve 17. This enables the brake system to conform to the changed requirements after response of the slip control system, and high pressure is made available for accomplishing a high braking force at the rear axle.

In case of need, the pressure level can be decreased to adopt the optimum value by means of actuation of the rear-axle valves EV, AV. On occurrence of a high friction value at the rear axle or in the presence of relatively low pressure in the booster chamber 11, for what most different reasons can apply, the bridging of the pressure reducer 22 permits to avoid an unwanted, disadvantageous pressure reduction at the rear axle.

It is particularly significant that the means proposed by this invention are extremely simple. Both the pressure reducer 22 and the check valve 24 allow to be unitized with the braking pressure generator 1 in an easy way. There will be no appreciable additional effort in comparison to brake systems not having the pressure reducer 22 which is adapted to be disabled or, respectively, bridged in the event of control action.

What is claimed is:

1. A slip-controlled brake system for automotive vehicles having front and rear brakes, said system comprising, in combination:

a braking pressure generator including a power brake booster provided with a source of auxiliary energy and a pressure chamber, said pressure generator further including a master cylinder provided with a working chamber therein;

a pressure supply reservoir connected to said pressure generator;

a first pressure conduit connecting said rear brakes to said power brake booster;

a normally open inlet valve inserted in said first pressure conduit;

a second pressure conduit connecting said front brakes to said working chamber of said master cylinder;

a normally open inlet valve inserted in said second pressure conduit;

a third pressure conduit connecting said front and rear brakes to said pressure supply reservoir;

at least one normally closed outlet valve inserted in said third pressure conduit;

a pressure reducer device inserted in said first pressure conduit between the normally open inlet valve therein and said power brake booster; and, means for providing a parallel pressure conduit bridging said pressure reducer device between said first conduit and said pressure chamber of said power brake booster during slip control.

2. The brake system according to claim 1, wherein said means includes a fourth pressure conduit having a check valve inserted therein and said fourth pressure conduit serially coupling said first pressure conduit with said working chamber and said pressure chamber.

* * * * *